United States Patent [19]
Waldenville

[11] 3,711,072
[45] Jan. 16, 1973

[54] APPARATUS FOR OXYGENATION OF LIQUIDS

[76] Inventor: David B. Waldenville, P.O. Box No. 231-West, Oklahoma City, Okla. 73123

[22] Filed: April 23, 1970

[21] Appl. No.: 31,307

[52] U.S. Cl. ....................261/122
[51] Int. Cl. ....................B01f 3/04
[58] Field of Search......261/121, 122, 123, 124, 114, 261/77; 210/220, 221, 14, 15; 4/180; 128/66; 55/95, 255, 256; 209/170; 23/271

[56] References Cited

UNITED STATES PATENTS

| | | | |
|---|---|---|---|
| 1,717,713 | 6/1929 | Logan | 261/122 |
| 2,138,349 | 11/1938 | Mallory | 210/220 X |
| 2,216,791 | 10/1940 | Simjian | 261/122 X |
| 2,518,746 | 8/1950 | Blohm et al. | 261/122 X |
| 2,570,215 | 10/1951 | Dice | 261/114 UX |
| 3,545,731 | 12/1970 | McManus | 261/122 |
| 682,171 | 9/1901 | Cartter | 4/180 |
| 2,637,541 | 5/1953 | Rubin | 128/66 UX |
| 2,848,203 | 8/1958 | Misure | 261/124 |

FOREIGN PATENTS OR APPLICATIONS

| | | | |
|---|---|---|---|
| 241,452 | 10/1925 | Great Britain | 261/122 |
| 694,918 | 7/1953 | Great Britain | 261/122 |
| 712,325 | 7/1954 | Great Britain | 261/122 |
| 934,146 | 8/1963 | Great Britain | 210/220 |
| 941,857 | 11/1963 | Great Britain | 210/220 |
| 1,014,123 | 12/1965 | Great Britain | 261/114 J P |

*Primary Examiner*—Tim R. Miles
*Attorney*—Dunlap, Laney, Hessin & Dougherty

[57] ABSTRACT

Apparatus for large volume oxygenation of water and the like, such apparatus being connectable to a suitable source of air or oxygen pressure and including distribution means for releasing air under pressure over a relatively large area within a sealed enclosure having at least a portion of the enclosure formed from permeable substance of predetermined porosity to air pressure such that the air or oxygen is released in finely divided form into contact with the water to effect oxygenation thereof.

6 Claims, 10 Drawing Figures

INVENTOR
DAVID B. WALDENVILLE
BY
Dunlap, Laney, Hessin & Dougherty
ATTORNEYS

INVENTOR
DAVID B. WALDENVILLE

BY
Dunlap, Laney, Hessin & Dougherty
ATTORNEYS

APPARATUS FOR OXYGENATION OF LIQUIDS

BACKGROUND OF THE INVENTION

1. Field of the Invention

The invention relates generally to water purification apparatus and, more particularly, but not by way of limitation, it relates to improved oxygenation apparatus for aerating large volumes of water at relatively rapid rates.

2. Description of the Prior Art

The prior art includes various types of aeration methods and apparatus capable of carrying out the required oxygenation of water or other liquid to a predetermined degree. The prior art teachings appear to have been influenced greatly by the past thinking and viewpoints on the subject of sewage processing, water purification, reclamation, etc. Many of such prior teachings deal with the old and well-known practice of dispersing the liquid up into the air through fountains, sprays and the like in an attempt to finally divide the water to allow absorption of the oxygen from surrounding air. Still other teachings contemplate the rapid movement of dispersion of the oxygenating gas into or with the liquid; however, such prior approaches do not appear to have contemplated the necessary extent and degree of oxygenation which is required in reconstituting any sizable body of water into a state reasonably close to natural occurring purity.

SUMMARY OF THE INVENTION

The present invention contemplates water purification and processing apparatus for merging an increased surface of aerating gas in contact with water or such liquid to be aerated. In a more limited aspect, the invention consists of a suitable source of air or oxygen under pressure applied to distribution means for releasing the gas over a large area within a sealed enclosure having at least a portion of its surface formed of porous substance which passes the gas therethrough and into the surrounding water as a multitude of small quantities or bubbles.

Therefore, it is an object of the present invention to provide apparatus for introducing increased surface area of air or oxygen into water for absorption therein.

It is also an object of the invention to provide an apparatus capable of oxygenating larger volumes of water in decreased times.

It is yet another object of the invention to provide apparatus which enables water purification and reconstitution to more desirable levels of oxygen content in relatively short time to relieve conditions of severe biological oxygen demand.

Finally, it is an object of the present invention to provide an apparatus for oxygenation of sewage waste water which is capable of practical reconstitution to a state of purity equivalent to that occurring in nature.

Other objects and advantages of the invention will be evident from the following detailed description when read in conjunction with the accompanying drawings which illustrate the invention.

DETAILED DESCRIPTION OF THE PREFERRED EMBODIMENT

Figure 1:
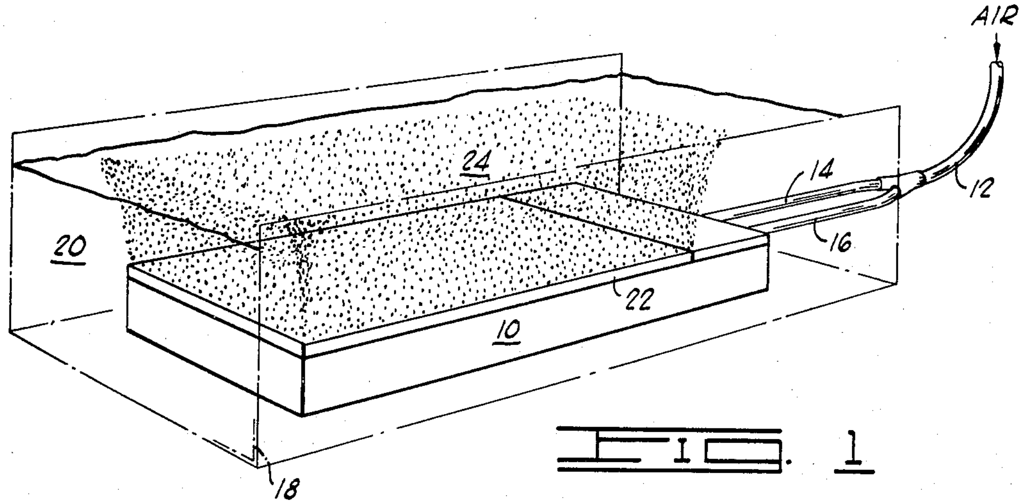
FIG. 1 is a partially schematic perspective view of the invention in a basic form as disposed in oxygenating relationship to a body of water.
Figures 2, 3, 4, 5:
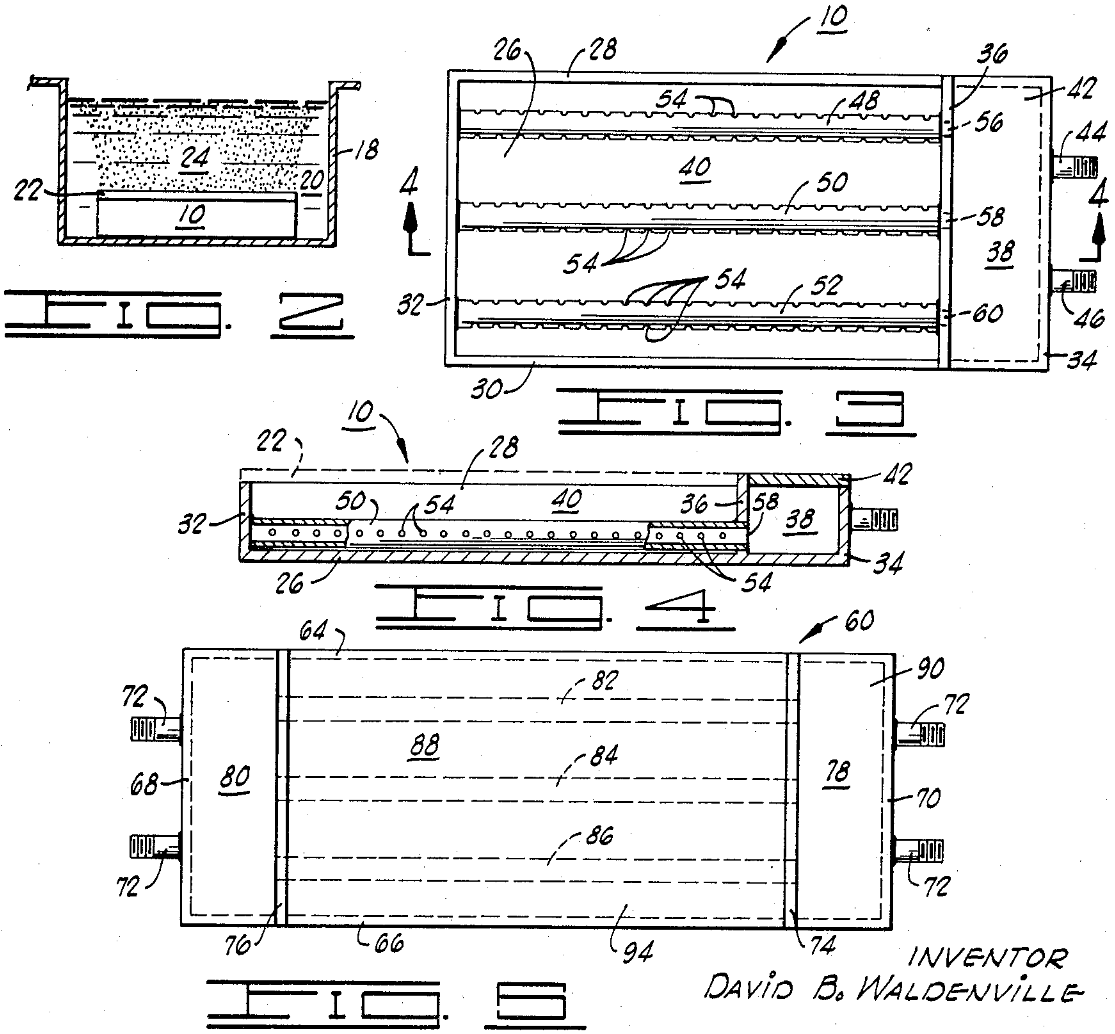
FIG. 2 is a vertical section taken transversely across the apparatus as shown in FIG. 1.
FIG. 3 is a top plan view of an oxygenator constructed in accordance with the invention with top panel removed.
FIG. 4 is a section taken along lines 4—4 of FIG. 3 with additional parts cutaway.
FIG. 5 is a top plan view with internal parts shown in dash-lines of an alternative form of the invention.

As shown in FIGS. 1 and 2, an oxygenating device 10 as activated by air pressure as applied via coupling hose 12 to a pair of connecting conduits 14 and 16 which supply air or oxygen under pressure to the interior of oxygenating device 10. The oxygenating device 10 is shown immersed within a containing configuration such as a sewage processing weir 18 which carries a body of liquid 20 such as sewage waste water, e.g., sewage water having undergone settlement and first or second stages of clarification.

A porous plate 22 is sealingly secured over the top of oxygenation device 10, and porous plate 22 serves to break up distributed air or oxygen under pressure within oxygenation device 10 for dispersion as a broad expanse of minute air bubbles upward through the liquid 20 to enable oxygenation through absorption. The porous plate 22 may be formed from any of various suitable materials which function to break the gas up into very small bodies, preferably bubbles in the 2 to 5 micron range. For example, it is contemplated that such porous plates be formed from ceramic materials of selected porosity, or from plastic materials capable of being molded, packed or otherwise combined into a relatively rigid sheet character while still maintaining a desired degree of porosity to the gas under pressure. One form of porous plate 22 which has been found to function to good advantage has been formed from sintered bronze plating of desired thickness and porosity. The sintered bronze materials are commercially available in any desired dimension or thickness as well as reliably regulated particle or gas permeability quotients.

Referring now to FIGS. 3 and 4, the oxygenation device 10 may be formed from any suitable panel materials such as plastic, sheet metal or the like, to be formed with a bottom panel 26, a pair of side panels 28 and 30 and end panels 32 and 34. The manner of forming, bending and joining may be any of the well-known practices available to the skilled artisan and as dictated by choice of materials. An intermediate panel 36 is sealingly secured across one end of device 10 to separate the volume into a baffle chamber 38 and a dispersion chamber 40. A cover panel 42 is then sealingly secured over the one end of the device 10 to seal the baffle chamber 38 from the external surrounds, while porous plate 22 is sealingly connected over the upper portion of dispersion chamber 40.

A pair of supply inlets 44 and 46 are connected through end wall 34 to provide introduction of air or oxygen under pressure into the baffle chamber 38. Thus, as shown in FIG. 1, the connector couplings 14 and 16 will be connected to each of inlets 44 and 46 to introduce the gas under pressure into baffle chamber 38, and baffle chamber 38 then receives the dual, spaced gas input to maintain a relatively constant gas flow throughout chamber 38. A plurality of dispersion tubes 48, 50 and 52 are then secured lengthwise through dispersion chamber 40. Each of dispersion tubes 48–52 includes a large plurality of relatively small holes 54 spaced therealong, and each dispersion tube 48 to 52 is secured so it is sealingly connected against end wall 32 but connected with a respective feed through 56, 58 and 60 formed in intermediate panel 36. Thus, gas such as air or oxygen within baffle chamber 38 is forced through feedthroughs 56–60 into respective dispersion tubes 48, 50 and 52 whereupon the gas is then uniformly dispersed along each of tubes 48–52 to provide continuous gas input throughout the total volume of dispersion chamber 40.

In operation, reference is made to the case of oxygenation of sewage waste water through introduction of air or pure oxygen in primary or secondary weirs. The air or oxygen is introduced through coupling hose 12 and connectors 14 and 16 to baffle chamber 38. The air or oxygen may be applied at pressures ranging from 10 up to 150 pounds per cubic inch depending upon exigencies of the particular purification situation. In any event, the pressurized air or oxygen within baffle chamber 38 is then flowed through feedthroughs 56, 58 and 60 into respective dispersion tubes 48, 50 and 52 whereupon the air or oxygen under pressure is forced through the porous panel 22 and up through the waste water 20 which continually flows over the oxygenating device 10. The air or oxygen is broadly dispersed through dispersion chamber 40 such that it is forced through porous plate 22 over the entire area and a great multitude of the oxygenating bubbles 24, e.g., bubbles of 2 to 5 microns diameter, pass up through water 20.

A device such as the oxygenating device 10 is capable of a very high degree of oxygenation of water to enable waste water treatment which is much improved to the prior and time-honored processes. It has traditionally been accepted that merely forcing a sizable reduction in biological oxygen demand (B.O.D.) would be sufficient and all that was required of the reasonable water reclamation entity. However, this is not good water, will not support marine life, nor does it have the necessary chemical constitution to satisfy the oxygen demands of the normal amount of microbodies which may be present therein.

While operating in accordance with the teachings of the present invention, it was found that a desirable oxygenation could be achieved in a very short time. For example, initial experimental results were obtained using a porous plate having a surface area of 0.66 square inches disposed to aerate a column of waste water 500 cc in volume as disposed in a graduated cylinder. The following results were obtained utilizing an original water sample of 70 ppm B.O.D.

| | |
|---|---|
| 30 seconds | 40 ppm B.O.D. |
| 1 minute | 10 ppm B.O.D. |
| 1 ½ minutes | 5 ppm B.O.D. |
| 2 minutes | 3 ppm Dissolved Oxygen |
| 5 minutes | 10 ppm Dissolved Oxygen |

It is readily noted then that between 1½ and 2 minutes the water sample passed from a B.O.D. or oxygen deficiency rating to a sample having 3 ppm Dissolved Oxygen present in the sample. It may be noted that naturally occurring, pure flowing water is generally rated at around 7–8 ppm Dissolved Oxygen (D.O.). While the above figures merely illustrate the rate of change for a single sample and volumetric situation, it is now ascertained that the desirable Dissolved Oxygen ratings can be achieved in very little time, in some cases less time than is presently utilized in prior types of purification systems which merely obtain a low B.O.D. rating before release of the waste water.

Figures 6, 7, 10:
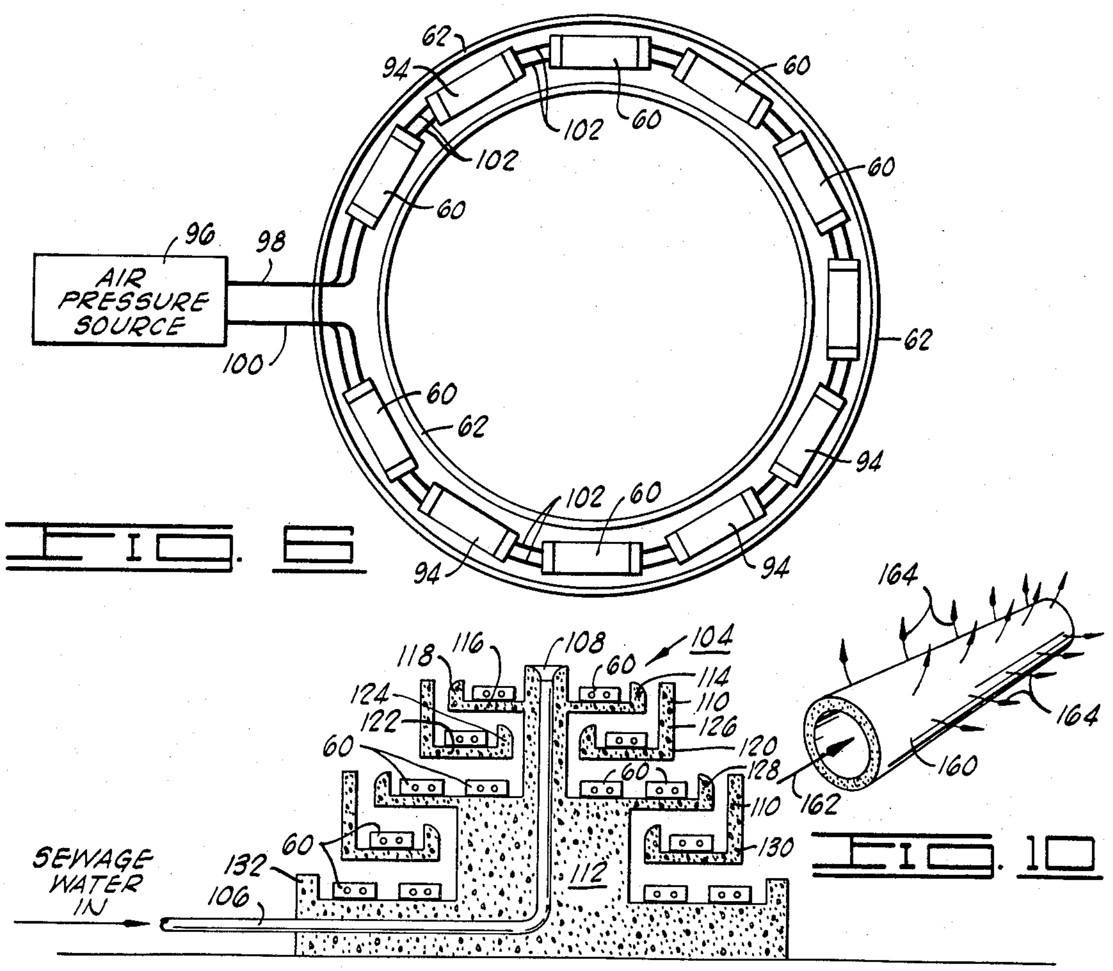
FIG. 6 is a plan of plural oxygenators constructed in accordance with the present invention.
FIG. 7 is a vertical cross-section of an oxygenating tower constructed in accordance with the present invention.
FIG. 10 is a functional view of still another alternative form of oxygenating device as constructed in accordance with the basic teachings set forth herein.

One practice which has proven to give good results in oxygenating large volumes of water in short time utilizes a plurality of oxygenating devices 60, as shown in FIG. 5, connected in series around a clarifying weir 62 or such as shown in FIG. 6. The oxygenation device 60 is a double-ended type of aerator suitable for connecting in series or series-parallel arrangements to cover a large area of water circulation. Thus, oxygenation device 60 consists of side panels 64 and 66 and end panels 68 and 70 forming the vertical framing of the device. Each of end panels 68 and 70 is fitted with a pair of spaced feed-through nipples or inlets 72. Oxygenation device 60 then includes a pair of intermediate baffles 74 and 76 disposed transversely across each end of the oxygenation device 60 to form a pair of respective baffle chambers 78 and 80.

Baffle chambers 78 and 80 are in communication via dispersion tubes 82, 84 and 86 with an inner dispersion chamber 88. The dispersion chamber 88 and respective dispersion tubes 82–86 are similar to that structure disclosed relative to dispersion chamber 40 of FIG. 3. That is, each of dispersion tubes 82 through 86 includes a plurality of holes for distributing pressurized air or oxygen evenly throughout the interior of dispersion chamber 88. A bottom panel, not specifically shown but similar to panel 26 of FIG. 3, is sealingly formed along the bottom side of oxygenation device 60, i.e., enclosing all of the lower sides of baffle chamber 78 and 80 and dispersion chamber 88. The upper portion of baffle chamber 78 and 80 is then sealingly closed off by upper panels 90 and 92 while a selected form of porous plate 94 seals off the top plane of dispersion chamber 88. The porous plate 94 may be formed similarly to and from like materials as the porous plate 22 as described above. It is contemplated that the oxygenation devices 60 may be constructed in one or two optimum sizes and dimensions adaptable for all anticipated usages.

FIG. 6 illustrates one mode of usage for a plurality of such oxygenation devices 60 connected in series about the weir 62. Waste water or such is flowed about the weir 62 to enable exposure to surrounding air, and the oxygenation process is greatly enhanced by addition of the oxygenation devices 60 therein. Thus, a suitable air pressure source 96 (or pure oxygen if desired) is connected to supply oxygenating gas at selected pressure via supply hoses 98 and 100 for input to opposite ends of a circuitous connection of oxygenation devices 60. Thus, each pair of oxygenation devices 60 is connected together by a pair of connector hoses 102 along the entire extent of weir 62. As many oxygenation devices 60 as desired may be employed, and the required air pressure is adjusted in accordance with the total release of finely divided air or oxygen from the respective porous plates 94 of each oxygenation device 60.

Figure 8:
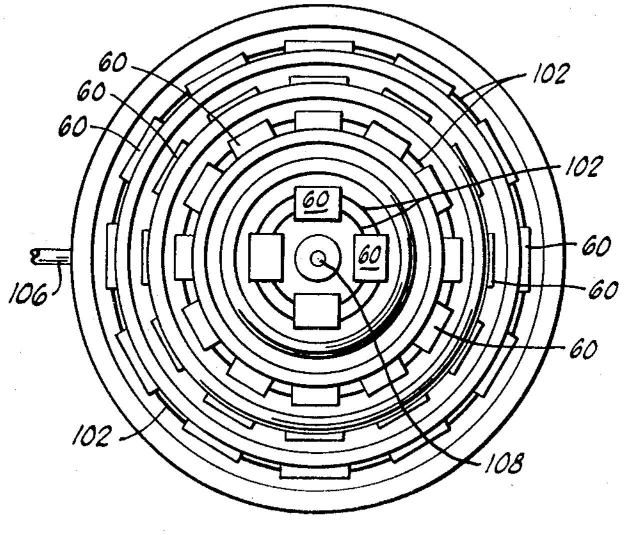
FIG. 8 is a top plan view of the oxygenating tower of FIG. 7.

FIGS. 7 and 8 disclose an alternative scheme for usage of such as the oxygenation devices 60, the series connector type. An oxidizing tower 104 receives such as sewage water input through a suitable conduit 106 which is led upward to terminate at a central, vertical opening 108 where the sewage water is dispersed into the air in largely fluent consistency. The oxidizing tower 104 may be formed from suitable steel reinforced concrete construction, and it consists of a plurality of stacked flow shelves 110 which increase in radius progressing down the tower 104. The series of flow shelves 110 enable reciprocal radial flow of the water over a plurality of oxygenation devices 10 suitably connected in series with the necessary air or oxygen supply. As shown in FIG. 8, the oxygenation devices 60 at each shelf level are connected in series by means of a plurality of inter-connector couplings 102. The tower 104 may be constructed with a plurality of air pressure sources supplying predetermined areas or levels of the structure, or, it may utilize a single air pressure source with plural control and bleeder valves disposed about the structure to adjust the pressures at each level.

The oxidizing tower 104 consists of a main support portion 112 which may be formed of concrete or suitable reinforcing materials. The support structure 112 then supports an inner shelf 114 having a flow portion 116 and a sidewall 118 over which the water flows radially to fall downward into a next outer shelf 120. The outer shelf 120 is formed similarly with a base portion 122 and a side rail 124, but it also includes an outer sidewall 126 of relatively large heighth which extends up to contain water flowing over sidewall 118 of shelf 114.

The same structure is then repeated as many times as desirable with the particular application as is exemplified by an inner shelf 128 in cooperation with an outer shelf 130. Each successive inner and outer shelf combination is of slightly larger radius as they progress down the oxidizing tower 104. Finally, a base shelf 132 provides a final oxygenation flow whereupon the purified water having the desired dissolved oxygen content is drawn off by conduit means (not shown) for flow to a repository, reservoir or whatever.

The depth of the respective sidewalls 118 is adjusted so that a suitable depth of water flows across each of the shelves over the particular oxygenation device 60 thus, as oxygenation progresses, water from tower outlet 108 flows radially outward over oxygenation device 60 to spill over sidewall 118 down into base 122 of outer shelf 122, then to flow radially inward to spill over inner side wall 124 and on downward again, etc. This radial back and forth flow across successive flow shelves containing oxygenation devices 60 tends to create extremely large air or oxygen area for contact with unit amount of water input.

Figure 9:
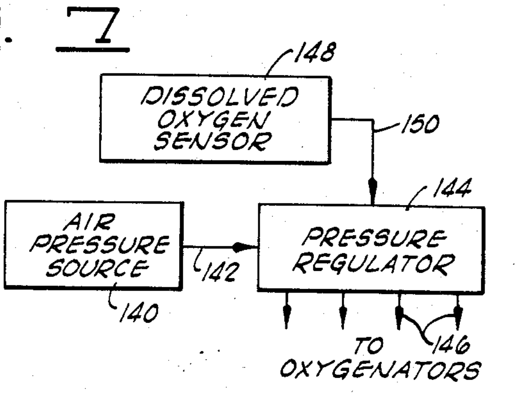
FIG. 9 is a block diagram of automatic sensing and control apparatus which may be utilized in conjunction with the invention as characterized in oxygenating tower of FIG. 7.

The diagram of FIG. 9 illustrates a form of automatic control apparatus which may be utilized to control the applied air pressure, or oxygen pressure as the case may be, in accordance with purification requirements. Thus, a suitable air pressure source applies air via conduit 142 to such as a bank of valve regulators within a pressure regulator 144. The pressure regulator 144 is shown with a plurality of oxygenation outputs 146; however, the pressure regulator 144 may be utilized with a single output depending upon the application.

A dissolved oxygen sensor 148 is disposed at a particularly beneficial point along an oxygenation path to sense the flowing water and provide an electrical output on line 150 which is indicative of the degree of oxygenation at that point in the flow of water. The control output line 150 is then utilized to energize the pressure regulator 144 so that the air pressure outlet on conduits 146 is increased or decreased in accordance with instantaneous oxygen demands. The dissolved oxygen sensor 148 is a commercially available type of device which is presently in use in diverse types of water treatment and reclamation process.

FIG. 10 illustrates still another basic teaching which is considered an inherent part of the present invention. That is, in many applications of larger scale it may be desirable to extrude or otherwise form entire conduit structures from porous material in order to enable an air separating or oxygenating unit capable of sufficient volume output. Thus, a round conduit 160 may be formed from suitable porous material such as sintered bronze or other non corrosive material, ceramic material of selected porosity, certain plastics of particular consistency and formation, or any other material or combination of materials which provide the desired foraminosity to achieve fine break up or air or oxygen input. As shown in FIG. 10, air or oxygen input via air hole 162 may be applied at a selected pressure, depending upon the application, whereupon breakup is affected to produce myraid air or oxygen flow paths 164 from the outer skin of the porous conduit 160. The conduit 160 can be formed in long, straight sections, or in Arcs, Tee's, Wye's, and whatever required utility forms and structures.

The foregoing discloses novel water treatment apparatus which enables reclamation of certain waste waters in a form equivalent to a naturally pure state. Prior forms of processing and reclamation of sewage water necessarily released a processed water product which was usually devoid of dissolved oxygen and still retaining a Biological Oxygen Demand equilibrium state, and the present invention enables a more complete oxygenation processing to a degree proportionate to whatever processing time available.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A device for total immersion in a liquid to release soluble gas in finely divided form for yielding increased dissolution of gas in the liquid, comprising:

enclosure means of generally elongated shape as formed by a bottom panel having oppositely disposed end panels and oppositely disposed side panels sealingly connected thereto, said end panels each including at least one nipple means communicating therethrough;

first and second intermediate panel means each disposed parallel to a respective one of said end panels and being sealingly connected to said side and bottom panels, said intermediate panel means each having a plurality of feed-through orifices communicating therethrough;

first and second cover panels each disposed at opposite end of said bottom panel and being sealingly connected to end and side panels and respective first and second intermediate panel means to define first and second baffle chambers;

porous plate means disposed centrally relative to said first and second cover panels and being connected to the side panels and respective first and second intermediate panel means to define a dispersion chamber in juxtaposition between said first and second baffle chambers;

a plurality of dispersion means each communicating between respective opposite feed-through orifices in said first and second intermediate panel means, each of said dispersion means including a plurality of small holes in communication with said dispersion chamber; and a source of gas under selected pressure for application to said end panel nipple means for flow through said baffle chambers and dispersion means thereby to be released into said dispersion chamber for passage and fine particulate break-up through said porous plate means into the surrounding solvent liquid.

2. A device as set forth in claim 1 wherein said porous plate means is formed from sintered bronze of predetermined porosity.

3. A device as set forth in claim 1 wherein said porous plate means is formed from porous ceramic material having predetermined permeability to passage of a selected gas such that there is released a plurality of gas bubbles having diameters in the 2 to 5 micron range.

4. An oxygenation device for treatment of liquid which is comprised of a tower means including conduit means receiving liquid under pressure for release at an elevated position atop said tower means, and a plurality of flow shelf means disposed progressively downward along said tower means such that successive ones of said flow shelf means receive said water as it continually flows in generally radial direction from said tower means elevated position, said plural flow shelf means further consisting of an inner flow shelf receiving liquid for radial outward flow and release over an outer perimeter and an outer flow shelf receiving water from said inner flow shelf perimeter for radial inward flow and release over an inner circular edge to a next lower inner flow shelf, each of said inner and outer flow shelves including a plurality of series-connected devices each of which comprise:

enclosure means of generally elongated shape as formed by a bottom panel having oppositely disposed end panels and oppositely disposed side panels sealingly connected thereto, said end panels each including at least one nipple means communicating therethrough;

first and second intermediate panel means each disposed parallel to a respective one of said end panels and being sealingly connected to said side and bottom panels, said intermediate panel means each having a plurality of feed-through orifices communicating therethrough;

first and second cover panels each disposed at opposite end of said bottom panel and being sealingly connected to end and side panels and respective first and second intermediate panel means to define first and second baffle chambers;

porous plate means disposed centrally relative to said first and second cover panels and being connected to the side panels and respective first and second intermediate panel means to define a dispersion chamber in juxtaposition between said first and second baffle chambers;

a plurality of dispersion means each communicating between respective opposite feed-through orifices in said first and second intermediate panel means, each of said dispersion means including a plurality of small holes in communication with said dispersion chamber; and a source of gas under selected pressure for application to said end panel nipple means for flow through said baffle chambers and dispersion means thereby to be released into said dispersion chamber for passage and fine particulate break-up through said porous plate means into the surrounding solvent liquid.

5. A device as set forth in claim 4 wherein said porous plate means is formed from sintered bronze of predetermined porosity.

6. A device as set forth in claim 4 wherein said porous plate is formed from ceramic material having predetermined permeability to passage of oxygen.

* * * * *